April 13, 1965 A. G. MAPP ETAL 3,178,560
ELECTRICAL DE-ICING DEVICES
Filed Nov. 14, 1961 2 Sheets-Sheet 1
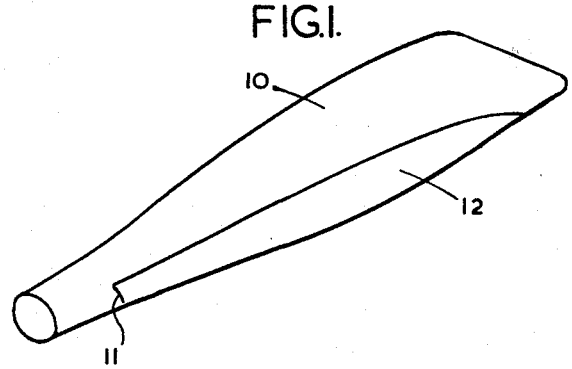
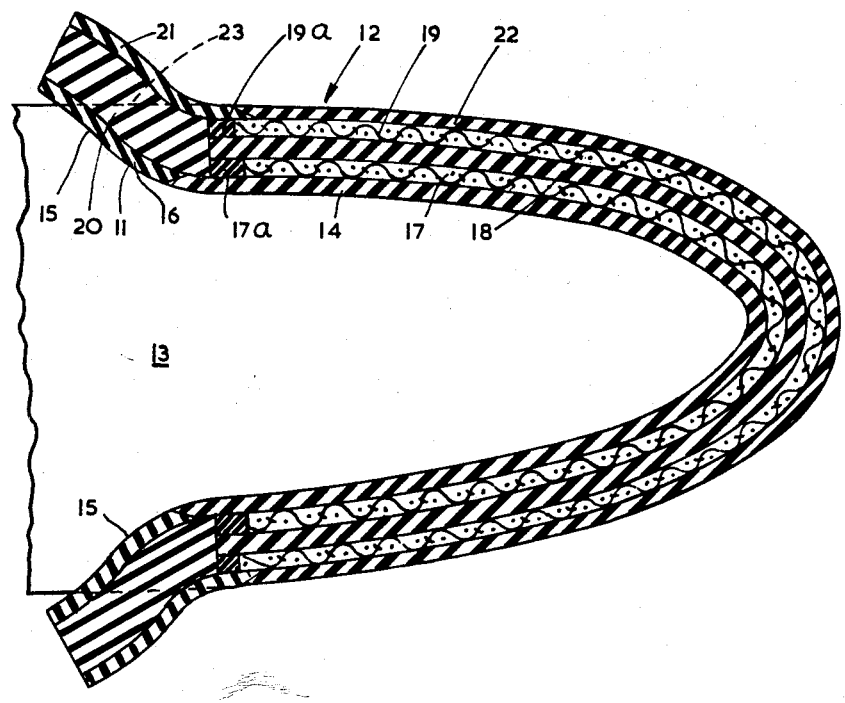
INVENTORS
ALFRED G. MAPP &
ARTHUR J. HAYWARD
By Reynolds + Christian
ATTORNEYS

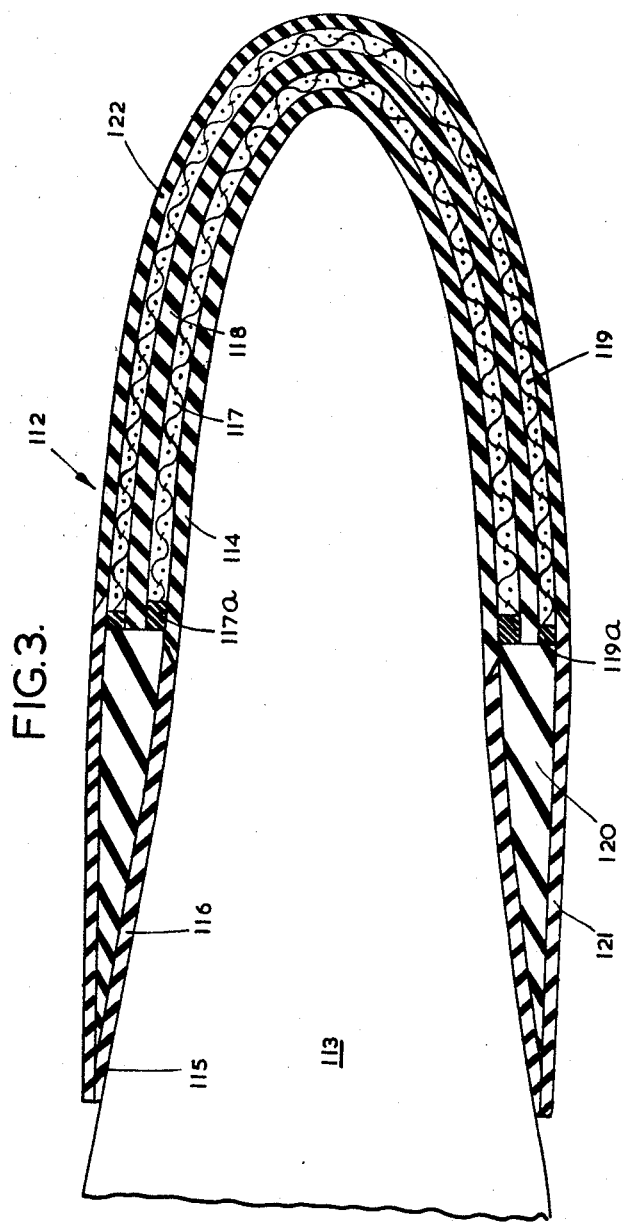

United States Patent Office 3,178,560
Patented Apr. 13, 1965

3,178,560
ELECTRICAL DE-ICING DEVICES
Alfred G. Mapp, Cheltenham, and Arthur J. Hayward, Longlevens, England, assignors to Dowty Rotol Limited, Cheltenham, England, a British company
Filed Nov. 14, 1961, Ser. No. 152,256
Claims priority, application Great Britain, Nov. 18, 1960, 39,776/60
9 Claims. (Cl. 219—528)

This invention relates to de-icing and like devices.

According to the invention, a de-icing device suitable for securing upon a part at least of a member to be de-iced is arranged such that substantially the whole of that surface layer of the device which will be exposed when the device is secured upon such a member consists of a sheet of abrasion-resistant flexible material, which by reason of its inherent nature or the incorporation therein of a metallic gauze is not trimmable at its edges, this sheet having an edge or edges in abutting relationship with a layer or layers of a readily-trimmable flexible material that can be applied to the surface of the member to be protected in a manner to resist its dislodgement.

The abrasion-resistant flexible material may be polyurethane sheet. The edge or edges of this sheet of abrasion-resistant flexible material may be in scarf-abutting relationship with the layer or layers of readily-trimmable flexible material.

By providing a de-icing device in accordance with the invention, the device has, by reason of the abrasion-resistant flexible material, good resistance to both abrasion and erosion, while any difficulties inherent in processing and trimming such abrasion-resistant material, to streamline it where it is applied to the member's surface, are substantially avoided by using, beyond its edge or edges, an edging of a suitable flexible material, for example rubber, which may be readily processed.

Also according to the invention, there is provided a method of making a de-icing device suitable for securing upon a part at least of a member to be de-iced, which method comprises the steps of (a) making, on a former, or directly on the member, a laminated structure of a resilient material, having a heating means enclosed therein, (b) securing to a portion or portions of the laminated structure a layer or layers of a readily-trimmable flexible material, and (c) securing to another portion or other portions of the laminated structure a layer or layers of abrasion-resistant flexible material, the edge or edges of which abut the layer or layers of readily-trimmable flexible material.

The invention has been devised as a deicer for the leading edge of an airplane propeller blade or other surface subject to abrasion. Such blades would be subject to abrasion from impact of stones, sand, and the like, drawn up at very high propeller speeds during take-off. An abrasion-resistant material, applicable to the blades, must be used, polyurethane for example, and such sheets may be associated with or embed a metallic and conductive gauze, or glass fiber. Their inherent characteristics, arising from their ability to resist abrasion, and the metallic or glass fibers associated with them, make scarfing thereof virtually impossible, yet scarfing is essential in order to streamline the deicer as a whole, and to fair its edges into the surface of the propeller blade, for otherwise in service adhesion of the deicer shoe may fail as a result of airflow and centrifugal effect on ragged edges thereof. It is to the solution of this problem that the present invention is directed.

One embodiment of the invention will now be particularly described with reference to the accompanying diagrammatic drawings, of which, FIGURE 1 shows an aircraft propeller blade with a deicing device or overshoe according to the invention fitted around the leading edge portion of the blade, FIGURE 2 shows in cross-section a de-icing device or overshoe according to the invention built-up upon a former, and, FIGURE 3 shows in cross-section an alternative form of deicing device construction according to the invention, built-up upon a former.

Referring to FIGURE 1 of the drawings, a propeller blade 10 is of airfoil cross-sectional shape, and a rebate 11 is formed around the leading edge portion of the propeller blade to accommodate a de-icing device or overshoe 12 without changing the designed overall cross-sectional shape in the proximity of the leading edge.

As shown in FIGURE 2, the overshoe generally indicated at 12, is arranged to be constructed upon a former 13 which approximates in shape the shape of the rebate on the aircraft propeller blade. The width of the rebate of the former, that is in a direction from the leading edge towards the trailing edge, is however somewhat greater than in the actual blade. The length of the rebate is also somewhat greater than the rebate of the actual blade. The overall shape of the rebate of the blade is such as to accommodate an overshoe, the end portion thereof nearest the hub end of the blade being approximately square cut and the end portion nearest to the tip of the blade being tapered or curved down to a final radiussed end.

The de-icing overshoe indicated at 12 is constructed in the following manner.

A first layer 14 of cured neoprene is laid upon the former, the edges of this layer being scarfed. This neoprene layer is applied upon the leading edge and is not sufficiently wide or long to reach the faces 15 of the former rebate. Between each of the edges of this layer 14 and the respective faces of the rebate there is applied upon the former a layer 16 of uncured nitrile rubber, the edges of which adjacent the neoprene layer 14 are scarfed to register and abut therewith. This layer 16 is part of an edging, later described more fully. A glass fibre layer 17 which incorporates a woven electric wire resistance element and which is impregnated with uncured neoprene is laid over the neoprene layer 14. The wire element of this layer is connectible in convenient manner with a source of electrical power. A further layer 18 of cured neoprene is laid over the glass fibre layer 17. A layer of nickel alloy gauze 19 which is impregnated with uncured neoprene, is then laid over the neoprene layer 18, this forming reinforcing protection for the resistance element in the layer 17. The layers, 17 and 19, are of approximate equal width but of slightly smaller width than the first neoprene layer 14, to enable pieces 17a and 19a of neoprene to be incorporated in the overshoe at either side of the gauze for adequate insulation. Similarly the glass fibre layer 17 and the gauze layer 19 are somewhat shorter in length than the first and second neoprene layers 14 and 18, to enable pieces of neoprene (not shown) to be incorporated in the overshoe at either end of the resistance element and at either end of the gauze. Between the edges of the laminate formed by the glass fibre layer 17, the neoprene layer 18 and the gauze 19, and the respective edge faces 15 of the rebate, an edging which includes packing pieces 20 of uncured nitrile rubber is provided. The outer surface of the packing pieces 20 are level with the outer, that is the exposed, surface of the gauze 19. A thin layer 21 of uncured nitrile rubber, that is the outer skin of the edging sheet or strip, is cemented over each of these packing pieces and slightly overlaps the outer surface of the gauze. The edges of each of these thin layers 21 of nitrile rubber, remote from the edge faces 15 of the rebate 11, are scarfed.

The laminated structure hereinbefore described, complete with its former, is then placed in a rubber vacuum bag and cured in an autoclave in known manner, additional heating being applied if desired by passing an electrical current through the resistance element in the layer 17.

Following curing, a sheet of polyurethane rubber 22, whose edges have been suitably scarfed by grinding, is secured by means of a cold-setting cement upon the gauze layer 19, the scarfed edges of this sheet abutting with the scarfed edges of the nitrile layers 21.

Since the rebate in the former is somewhat larger in width and length than the blade rebate, it will be seen that when the overshoe is cemented into the blade rebate, it will project somewhat out of the rebate on to the working surface of the blade adjacent the rebate, the layers of the moulded laminate following the curvature of the face of the rebate.

This projecting part of the overshoe edging must then be removed by discing or sanding. All of it, at 16, 20, and 21, is of nitrile rubber, and since nitrile rubber is readily sanded, this projecting part may easily be removed along the dotted line 23 in FIGURE 2 of the drawings, to produce the required smooth blade contour. When applied to a blade rebated similarly to the former 13, the resultant composite surface is smooth.

Referring now to FIGURE 3, the overshoe which is generally indicated at 112, is arranged to be constructed upon a former 113 which is not provided with a rebate as such, but instead is suitable accurately contoured so that when the overshoe is fitted to a propeller blade of similar cross-section to the former, the combination of blade and overshoe give a desired aero-dynamic shape.

The de-icing overshoe 112 is constructed in the following manner.

A first layer 114 of cured neoprene is laid upon the former 113, the edges of this layer being scarfed. This neoprene layer is moulded upon the leading edge of the former and adjacent each edge of this layer 114 there is applied upon the former a layer 116 of uncured nitrile rubber, the edge of which adjacent the neoprene layer 114 is scarfed to register and abut therewith. A glass fibre layer 117 which incorporates a woven electric wire resistance element and which is impregated with uncured neoprene is laid over the neoprene layer 114. The wire element of this layer is connectible in convenient manner with a source of electrical power. A further layer 118 of cured neoprene is laid over the glass fibre layer 117. A layer of nickel alloy gauze 119 which is impregnated with uncured neoprene, is then laid over the neoprene layer 118, this forming reinforcing protection for the resistance element in the layer 117. The layers 117 and 119 are of approximately equal width with a slightly smaller width than the first neoprene layer 114, to enable pieces 117a and 119a of neoprene to be incorporated in the overshoe at either side of the gauze for adequate insulation. Similarly the glass fibre layer 117 and the gauze 119 are somewhat shorter in length than the first and second neoprene layers 114 and 118, to enable pieces of neoprene (not shown) to be incorporated in the overshoe at either end of the resistance element and at either end of the gauze. Bordering the edges of the laminate formed by the glass fibre layer 117, the neoprene layer 118 and the gauze 119, are packing pieces 120 of uncured nitrile rubber. The outer surface of the packing pieces 120 are level with the outer, that is, the exposed surface of the gauge 119. A thin layer 121 of uncured nitrile rubber is cemented over each of these packing pieces and slightly overlaps the outer surface of the gauge. The overlapping edges of each of these thin layers 121 of nitrile rubber are scarfed. The laminated structure hereinbefore described, complete with its former, is then placed in a rubber vacuum bag and cured in an autoclave in known manner, additional heating being applied if desired by passing an electrical current through the resistance element in the layer 117.

Following curing, a sheet of polyurethane rubber 122 whose edges have been suitably scarfed by grinding is secured by means of a cold-setting cement upon the gauze layer 119, the scarfed edges of this sheet abutting the nitrile rubber layers 121.

In the construction of FIGURE 3 the packing pieces 120 are suitably shaped in cross-section as to afford a laminate of tapering cross-section towards the trailing portion, that is towards the left in the drawing. Further by reason of the mouldable properties of nitrile rubber the layer 116 and 121 may be molded in feathered manner towards the trailing portion. These layers may additionally be ground or sanded to provide a fine feathered trailing portion which blends with or fairs into the contoured surface 115 of the former, and thus of the propeller blade to which the overshoe is ultimately fitted, to achieve the desired smooth aerodynamic shape.

In an alternative embodiment of the invention, an overshoe and a method of producing an overshoe is provided which is in all respects similar to the construction and process according to FIGURE 2, except that the layer 14 of neoprene and the layer 16 of uncured nitrile rubber, are replaced by a single layer of suitable insulating grade nitrile rubber.

In a further embodiment of the invention as an alternative to the construction of FIGURE 3, the layers 114 and 116 may again be replaced by a single layer of suitable insulating grade of nitrile rubber.

Polyurethane is resistant to erosion and also resistant to the adverse effects of ester-based lubricants, and kerosene, with which the overshoe may come into contact in operation of the propeller. The cement used in applying the polyurethane sheet 22, and 122, to the gauze layers 19 and 119 respectively, and in applying the overshoe to the propeller blade, is of a type also resistant to ester-based lubricants and kerosene.

By providing the readily trimmable edging sheets in the form of nitrile rubber layers in scarfed abutting relation with the polyurethane sheet, difficulties in trimming of polyurethane do not arise in the fitting of the overshoe to the blade.

We claim as our invention:

1. A de-icing device suitable for securing upon a part at least of a member such as a propeller blade, to be de-iced, said device including a protective sheet of abrasion-resistant flexible material of dimensions to cover at least the major portion of that part of the member that is to be protected, an edging of a readily-trimmable flexible material abutting and joined to the edges of the sheet of abrasion-resistant material, the chordwise edges of the abutting sheet and the edging material being complementally scarfed, and heating means beneath said protective sheet, and enclosed at its edges by said edging.

2. A de-icing shoe for application to an airfoil surface, comprising an outer sheet primarily of flexible material which is abrasion-resistant but is incapable of accurate edge-trimming, an electrically insulated electric resistance wire element in sheet form and also flexible, underlying and protected by said abrasion-resistant sheet, an inner flexible sheet of electric insulating material for application to the airfoil's surface, underlying said electric resistance wire element, the chordwise edges of the electric resistance wire element terminating no farther outward than the like edges of the outer sheet, and all terminating short of the edges of the surface to be protected, and a separate edging of insulating and readily trimmable material interposed at such edges between the outer and inner sheets, and trimmed to fair into the surface of the airfoil.

3. A de-icing shoe as in claim 2, wherein the chordwise edges of the outer sheet of the abrasion-resistant and non-trimmable material are scarfed, and terminate no farther outward than the like edges of the electric resistance wire element, and the readily trimmable edging is scarfed complementally to the scarfed edges of the outer sheet, lies flush with the outer surface of the abrasion-resistant sheet, and overlies the edges of the electric resistance wire element, so that excess material of the edging can be trimmed to become substantially flush with the airfoil's surface, and thereby to fair the shoe as a whole into the surface of the airfoil.

4. A de-icing shoe for application to an airfoil surface, comprising an outer sheet of material which is abrasion-resistant but incapable of accurate edge-trimming, of chordwise extent less than sufficient to surround the portion of the airfoil surface to which the shoe is to be applied, an electrically insulated electric resistance wire element in sheet form and also flexible, underlying said abrasion-resistant sheet, but of an extent chordwise less than the portion of the airfoil surface to which the shoe is to be applied, and an edging of electrical insulating and readily trimmable material applied to the edges of the electric resistance wire element and of the outer sheet, flush with the latter, and initially extending chordwise beyond the portion of the airfoil surface to which the shoe is to be applied, and trimmed of excess material to fair into the airfoil's surface beyond such portion thereof.

5. A de-icing shoe as in claim 4, wherein the edging includes an outer skin of readily trimmable material and of thickness corresponding to that of said outer sheet, and scarf-butted to the edge of the latter, and an inner portion extending along the edge of the electric resistance wire element.

6. A de-icing shoe as in claim 5, including an inner sheet underlying the electric resistance wire element, the edging also including an inner skin of readily trimmable material and of thickness corresponding to that of the inner sheet, and scarf-butted to the edge of the latter.

7. A de-icing shoe for application to an airfoil surface, comprising a laminate body of chordwise extent less than sufficient to surround the portion of the airfoil surface to which the shoe is to be applied, and an edging applied to the edges of said laminate body and extending chordwise at least to the edges of the portion to which the shoe is to be applied; the laminate body including an outer sheet of material which is abrasion-resistant and not readily trimmable, a protective and flexible sheet of gauze underlying said abrasion-resistant outer sheet, a flexible sheet of electric resistance wire material underlying said sheet of gauze, and extending chordwise at least to the edges of the abrasion-resistant sheet, a flexible sheet of electrical insulating material interposed between said sheet of resistance wire and said sheet of gauze, and an inner sheet of electrical insulating material underlying all other sheets; the edging comprising an outer skin of a thickness corresponding to the thickness of the outer sheet of the laminate body, and scarf-butted to the edge thereof; an inner skin of a thickness corresponding to that of the inner sheet of the laminate and butted thereto, and an intermediate portion of electric insulating material extending along the edge of the laminate body, to seal the sheet of electric resistance wire, said edging throughout being of a material which is readily trimmable, and faired by such trimming into the airfoil's surface beyond that portion to which the shoe is applied.

8. A de-icing and protective shoe for application to an airfoil surface or the like, comprising a laminate body shaped to enclose at least the major part of that area of the airfoil surface which is to be protected, the laminate body including a flexible and abrasion-resistant outer sheet of a material not readily trimmable, and a flexible heating element therewithin, said laminate body having abrupt terminal edges, and an edging abutting such abrupt edges of the laminate body, and formed of a readily trimmable rubber-like material, whereby by trimming it the laminate body as a whole can be faired into the surface of the airfoil.

9. A de-icing and protective shoe as set forth in claim 8, wherein the abrupt edges of the laminate body, including the edges of the outer sheet, terminate short of the entire area of the airfoil that is to be covered, and such edges of the outer sheet are scarfed, and wherein the edging includes an outer sheet of readily trimmable material scarfed complementally to the scarfed edges of the abrasion-resistant outer sheet, and abutting the same, and extending outwardly from the laminate body to close over the remainder of the area of the airfoil that is to be covered, and by trimming to fair the shoe into the airfoil surface.

References Cited by the Examiner

UNITED STATES PATENTS

| | | | |
|---|---|---|---|
| 2,741,692 | 4/56 | Luke | 219—528 |
| 2,767,461 | 10/56 | Lebold et al. | 29—156.8 |
| 2,783,358 | 2/57 | Wolf | 219—529 |
| 2,834,395 | 5/58 | Russel et al. | 156—498 |
| 2,844,696 | 7/58 | Custer | 219—345 |
| 2,862,097 | 11/58 | Negromanti | 219—499 |
| 2,942,330 | 6/60 | Luke | 29—155.5 |
| 2,945,938 | 7/60 | Alvord | 219—214 |
| 2,990,607 | 7/61 | Negromanti | 29—155.5 |
| 2,992,317 | 7/61 | Hoffman | 219—202 |
| 3,127,135 | 3/64 | Burr et al. | 244—126 |

FOREIGN PATENTS 949,864   3/49   France.

RICHARD M. WOOD, *Primary Examiner.*

MAX L. LEVY, *Examiner.*